United States Patent [19]
Thoma et al.

[11] Patent Number: 4,894,428
[45] Date of Patent: Jan. 16, 1990

[54] PROCESS FOR COATING SUBSTRATES WITH POLYURETHANE UREAS

[75] Inventors: Wilhelm Thoma, Leverkusen; Josef Pedain, Cologne; Waldemar Kling, Kuerten-Bechen, all of Fed. Rep. of Germany

[73] Assignee: Bayer Aktiengesellschaft, Bayerwerk, Fed. Rep. of Germany

[21] Appl. No.: 292,698

[22] Filed: Jan. 3, 1989

[30] Foreign Application Priority Data

Jan. 9, 1988 [DE] Fed. Rep. of Germany ....... 3800435

[51] Int. Cl.$^4$ .......................... B05D 3/02; C08G 18/10
[52] U.S. Cl. ..................... 528/45; 427/342; 427/389.9; 428/264; 428/267; 428/423.1; 428/425.1; 524/589; 528/64
[58] Field of Search .............................. 427/342, 389.9; 524/589; 528/45, 64; 428/264, 267, 823.1, 425.1

[56] References Cited

U.S. PATENT DOCUMENTS 3,711,571  1/1973  Farah ................................... 260/858
4,248,756  2/1981  Konig et al. .................. 427/385.5 X
4,363,686  12/1982  Komarek ............................. 156/242

FOREIGN PATENT DOCUMENTS

970459 — 5/1963  United Kingdom .
1085454  11/1965  United Kingdom .

Primary Examiner—Michael Lusigman
Attorney, Agent, or Firm—Joseph C. Gil; Thomas W. Roy

[57] ABSTRACT

The present invention is directed to a process for coating substrates with polyurethane ureas which is characterized in that a substrate is coated with a product, which has been obtained by the reation of (A) a prepolymer based on an aromatic polyisocyanate containing on average two ketoxime-blocked NCO groups and having an average molecular weight of about 500 to 15,000 with (B) a chain-extending agent corresponding to the formula

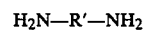

$$H_2N-R'-NH_2$$

in which R' is an aliphatic or cycloaliphatic radical, in the presence of solvents at temperatures above 50° C. and at an equivalent ratio of blocked NCO groups to NH$_2$ groups of 1.43 to 1.02, wherein after about 40 to 90% of the available amino groups have reacted, the reaction is completed with crosslinking at temperatures above 120° C.

The present invention is also directed to the coated substrates produced by this process.

9 Claims, No Drawings

PROCESS FOR COATING SUBSTRATES WITH POLYURETHANE UREAS

BACKGROUND OF THE INVENTION

1. Field of the Invention

This invention relates to a process for coating substrates with polyurethane ureas and to the substrates thus coated.

2. Description of the Prior Art

It is known that sheet-form textiles can be coated with polyurethane urea solutions containing up to 75% by weight solvents. It is possible to use either fully reacted polyurethane ureas or polyurethane ureas which have to be post-crosslinked with a second component to develop their coating properties. Coating compositions of this particular type are described, for example, in U.S. Pat. No. 3,711,571. In this case, dissolved polyurethane ureas are mixed with oxime-blocked NCO prepolymers and the resulting mixture is hardened during a heat treatment in a drying tunnel. Accordingly, a crosslinker has to be added during preparation of the spreading or coating paste.

GB-PS No. 970,459 describes a process for bonding a foam sheet to a textile substrate. The adhesive coating consists of a reactive mixture consisting essentially of a ketoxime-blocked NCO prepolymer and N,N,N',N'-tetrakis-(2-hydroxypropyl)-ethylene diamine as crosslinking agent. This system hardens through urethane groups and not through urea groups. In this case, too, a reactive component has to be added to the spreading paste before processing.

DE-OS No. 2,902,090 (U.S. Pat. No. 4,248,756) describes two-component coating systems of ketoxime-blocked prepolymers and, inter alia, 4,4'-diamino-3,3'-dimethyldicyclohexylmethane as crosslinkers/hardeners containing ≦15% by weight solvent in the preparation. The crosslinking reaction takes place in a single step at temperatures of 120° to 190° C. and preferably at temperatures of 140° to 170° C. Coating systems of this type undergo a pronounced heat-induced reduction in viscosity before the reaction of the blocked NCO prepolymer with the crosslinking polyamine. This reduction in viscosity presents penetration problems in direct coating and lamination which have to be overcome by special measures.

It is an object of the present invention to provide a process for coating substrates with polyurethane ureas which obviates the disadvantages of known coating processes.

SUMMARY OF THE INVENTION

The present invention is directed to a process for coating substrates with polyurethane ureas which is characterized in that a substrate is coated with a product, which has been obtained by the reaction of (A) a prepolymer based on an aromatic polyisocyanate containing on average two ketoxime-blocked NCO groups and having an average molecular weight of about 500 to 15,000 with (B) a chain-extending agent corresponding to the formula

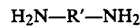
H$_2$N—R'—NH$_2$ in which R' is an aliphatic or cycloaliphatic radical, in the presence of solvents at temperatures above 50° C. and at an equivalent ratio of blocked NCO groups to NH$_2$ groups of 1.43 to 1.02, wherein after about 40 to 90% of the available amino groups have reacted, the reaction is completed with crosslinking at temperatures above 120° C.

The present invention is also directed to the coated substrates produced by this process.

DETAILED DESCRIPTION OF THE INVENTION

The advantages of the thermosetting polyurethane ureas according to the invention for direct and transfer coating is that no crosslinking agents and/or hardeners and/or catalysts have to be added during the preparation of the coating paste, so that the processor in charge of the coating process is able to handle the paste without any problems. In addition, the processor is not presented with any pot-life problems because the coating pastes undergo no increase in viscosity in the absence of crosslinking agents and catalysts.

The pronounced heat-induced reduction in viscosity before the reaction of the blocked NCO prepolymers with the crosslinking polyamine observed with the products obtained by the process according to DE-OS No. 2,902,090 (which presents problems of penetration in direct coating and lamination that have to be overcome by special measures) does not occur with the products obtained by the process according to the present invention. The products obtained by the process according to the invention may be used for direct coating and as adhesive coatings for lamination without any troublesome penetration.

A major advantage lies in the ability to laminate surface coatings of aromatic one-component polyurethanes with DMF-free adhesive coatings without the extremely troublesome "frosting" effect caused by swelling.

Although it is possible in principle to add standard hardeners, crosslinking agents and/or catalysts in the process according to the invention to accelerate or complete the hardening reaction, it is preferred not to use such additives. The process according to the invention may be used both for direct coating and for transfer coating. Suitable substrates include, in particular, sheet-form textile materials and leather. The coating composition may also contain pigments, fillers, solvents and other additives of the type commonly used for coating compositions. The equivalent ratio of blocked NCO groups to NH$_2$ groups is preferably about 1.18:1 to 1.05:1.

In the first chain-extending step, which preferably takes place at about 50° to 120° C., more preferably at about 70° to 100° C., about 50 to 70% of the available amino groups are reacted.

Aromatic diisocyanates of the type described, for example, in U.S. Pat. Nos. 3,984,607 and 4,035,213 (both of which are hereby incorporated by reference in their entireties), DE-OS No. 2,402,840 and in DE-AS No. 2,457,387, are suitable for the synthesis of the ketoxime-blocked NCO prepolymers.

2,4'- and 4,4'-diisocyanatodiphenyl methane, the isomeric toluylene diisocyanates and mixtures of these diisocyanates are preferred.

Suitable reactants for these diisocyanates for the preparation of the NCO prepolymers include polyhydroxyl compounds which contain two hydroxyl groups and have a molecular weight of about 500 to 10,000, preferably about 1000 to 6000, of the type described in detail in the publications cited above.

Preferred polyhydroxyl components include polyhydroxypolyethers containing two hydroxy groups such as propylene oxide polyethers containing ethylene oxide (EOX) units, preferably about 30 to 90% by weight EOX units, and more preferably about 40 to 80% by weight EOX units; pure EOX polyethers; polyhydroxypolyesters, for example hydroxypolyesters melting below 60° C. which contain two terminal OH groups (such as polyhydroxypolyesters of adipic acid, hexane-1,6-diol and neopentyl glycol) and which have an average molecular weight of about 1000 to 6000, preferably about 1000 to 3000; mixtures of the above-mentioned polyhydroxypolyethers with polyhydroxypolyesters; and hydroxypolycarbonates of hexanediol, hydroxyethoxyhexanol or hydroxypolycaprolactone and diphenyl carbonate.

The polyether content of the mixtures is preferably about 30 to 99% by weight, more preferably about 40 to 90% by weight.

Low molecular weight diols having a molecular weight of less than about 300, known chain-extending agents, may also be used in the preparation of the NCO prepolymers. Preference is attributed in this regard to butane-1,4-diol and hexane-1,6-diol.

The NCO prepolymers are prepared in known manner by reacting the polyhydroxyl compounds with excess diisocyanate, preferably at about 70° to 110° C. The reaction is generally carried out with an NCO/OH ratio of about 1.5:1 to 6.0:1, preferably about 1.7:1 to 2.5:1.

Suitable blocking agents for the NCO prepolymers include ketoximes of hydroxylamine and ketones such as acetone, methyl ethyl ketone, diethyl ketone, cyclohexanone, acetophenone and benzophenone.

The preferred blocking agent is methyl ethyl ketoxime (butanone oxime). The blocking reaction is carried out, for example, by reacting the NCO prepolymer with stoichiometric quantities of ketoxime at elevated temperature, for example at about 70° to 100° C., until the NCO groups can no longer be detected.

According to the invention, the blocked NCO prepolymers are reacted with a substoichiometric quantity of the chain-extending agents (B) before coating the substrate; the reaction is carried out in the presence of solvents at temperatures above 50° C.

Examples of suitable solvents, which may be used individually or in mixtures include toluene, xylene, mixtures of alkylated aromatic hydrocarbons, propanols, butanols, amyl alcohols, methoxypropanol, ethyl acetate, butyl acetate, methoxypropyl acetate, DMF, methyl ethyl ketone, methyl isobutyl ketone and cyclohexanone.

The reaction of the NCO prepolymers (A) with the chain-extending agents (B) is carried out, for example, in concentrations of about 30 to 90% by weight, preferably about 40 to 70% by weight at temperatures of about 50° to 120° C., preferably about 70° to 100° C.

The equivalent ration of the blocked NCO groups in the prepolymers (A) to the amino groups in the chainextending agent (B) is between 1.43 and 1.02, preferably between 1.18 and 1.05. Suitable chain-extending agents for the NCO prepolymers (A) include ethylenediamine, propylenediamine, 1,4-cyclohexanediamine, 1,3-cyclohexanediamine, piperazine, isophoronediamine and, in particular, diamines corresponding to the following formula

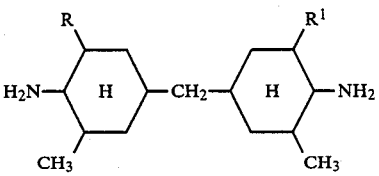

wherein R and $R^1$ represent H or $C_1$-$C_4$ alkyl, preferably methyl.

Examples include 4,4'-diaminodicyclohexyl methane and, with particular preference, 4,4'-diamino-3,3'-dimethyl dicyclohexyl methane which is liquid at room temperature and has a very low vapor pressure.

Known additives such as pigments, solvents, UV stabilizers, levelling agents, antioxidants, fillers and blowing agents may be added to the reactive mixtures according to the invention for the preparation of ready-to-use coating compositions.

It is possible with the thermosetting reactive mixtures to prepare coatings both by direct coating and by transfer coating in any of the coating installations normally used in practice. In this connection, it is possible to produce layers having different properties, for example an adhesive coat, an intermediate coat or a surface coat depending upon the particular specific chemical structure of the NCO prepolymer.

A transfer coating may be prepared as follows. The reactive mixture for the surface coating is first applied to a suitable temporary support, for example a release paper, in a quantity of about 30 to 100 g/m². The coating thus applied is hardened in a drying tunnel. The reactive mixture for the adhesive coating is applied to the dry surface coating, again in a quantity of about 30 to 100 g/m² and the substrate is applied by lamination. The coating is hardened in another drying tunnel at about 120° to 190° C., preferably about 150° to 160° C. and the coated substrate is peeled of the temporary support. However, it is of course also possible to produce only the surface coating or the adhesive coating from the coating compositions according to the invention and to use a conventional coating system for the other coating.

As already mentioned, the reactive mixtures may also be applied to the textile substrate by direct coating in one or more layers. They may be combined with layers of one-component or two-component PUR.

When intermediate coatings are prepared from the coating compositions according to the invention, compounds which give off gases during heating may optionally be added as blowing agents. Foam stabilizers are also preferably added. Suitable additives are described, for example, in DE-OS No. 1,794,006 (GB-PS No. 1,211,339) and U.S. Pat. No. 3,262,805 (herein incorporated by reference).

The invention is further illustrated but is not intended to be limited by the following examples in which all parts and percentages are by weight unless otherwise specified.

EXAMPLES

EXAMPLE 1

Adhesive coat (according to the invention)

520 g of a polyether, OH value 28, of 85% propylene oxide and 15% by weight ethylene oxide started with 1,2-propylene glycol, 400 g of a polyether, OH value 56, of propylene oxide started with 1,2-propylene glycol and 1340 g of a polyester, OH value 56, based on adipic acid and a mixture of hexane-1,6-diol and neopentyl glycol (weight ratio 65:35) were reacted with 500 g of 4,4'-diisocyanatodiphenyl methane in 680 g of methoxypropyl acetate at 90° C. The NCO groups of the prepolymer were blocked with 206 g butanone oxime at 80° to 90° C. After dilution with 680 g of isobutanol, the blocked NCO prepolymer was present in the form of a 68.6% solution; NCO content 1.9%. The blocked NCO groups were then reacted with 210 g of 3,3'-dimethyl-4,4'-diaminodicyclohexyl methane, corresponding to approximately 90% of the calculated quantity, in about 1 hour at 90° to 100° C. The resulting 70% solution of a polyurethane urea containing a residue of blocked NCO groups and a residue of amino groups (the base nitrogen content of the solution was 0.27%) had a viscosity of 25,000 mPa.s/25° C.

Surface coat 1 (D1)

500 g of a polyester of a hexanediol/neopentyl glycol (weight ratio 65:35) and adipic acid, OH value 65, were reacted with 140 g of isophorone diisocyanate at 90° C. to form an NCO prepolymer. The NCO prepolymer thus formed was dissolved in 800 g of toluene and a solution of 60 g of isophoronediamine in 730 g of isopropanol and 100 g of 1-methoxy-2-propanol was added dropwise with thorough stirring at 20° C. An approximately 30% solution having a viscosity of approximately 25,000 mPa.s at 25° C. was obtained.

Surface coat 2 (D2)

In a reaction screw, 680 g of a polyester of butane-1,4-diol and adipic acid, OH value 45, were reacted with 255 g of diphenylmethane-4,4'-diisocyanate and 65 g of butane-1,4-diol at a temperature which was increased from 80° to 180° C. to form the polyurethane, and were subsequently extruded and granulated while cooling. 250 g of the resulting granulate were dissolved in a mixture of 375 g of DMF and 375 g of toluene. The 25% solution had a viscosity of approx. 10,000 mPa.s at 25° C.

Surface coat 3 (D3)

2000 g of a polyether based on trimethylolpropane and propylene oxide (molecular weight 6000), 1000 g of a linear polyether based on propylene glycol and propylene oxide (molecular weight 1000), 1450 g of a linear polyester based on hexane-1,6-diol, neopentyl glycol (weight ratio 65:35) and adipic acid (molecular weight 1700) and 22.5 g of butane-1,4-diol were reacted with 1125 g of 4,4'-diisocyanatodiphenyl methane and 174 g of 2,4-diisocyanatotoluene for about 3 hours at 80° to 90° C. until the NCO content fell below the calculated value of 4.26% by weight. 496 g of butanone oxime and 696 g of propylene glycol monomethyl ether acetate were then rapidly stirred in at 60° to 70° C. After 20 minutes, no more NCO could be detected by IR spectroscopy. The blocked NCO prepolymer was a colorless clear liquid having a viscosity of approximately 40,000 mPa.s at 20° C., an NCO content of 3.3% by weight and an NCO equivalent weight of 1280.

Surface coat 4 (D4)

485 g hexanediol adipate (OH value 134)
20 g trimethylolpropane
85 g propoxylated adduct of 2-butene-1,4-diol and NaHSO$_3$ (molecular weight 425)
365 g 4,4'-dicyclohexylmethane diisocyanate
67 g 1,6-hexane diisocyanate
50 g acetone azine
107 g N-methylpyrrolidine
1500 g deionized water Procedure: DE-OS No. 2,811,148 (U.S. Pat. No. 4,269,748, herein incorporated by reference)

The resulting dispersion had a solids content of 40%, a Ford cup viscosity (4 mm orifice) of 19 seconds and a pH value of 6.8.

After adjustment of the pH value to 8 to 9 with concentrated ammonia, 1000 g of this PUR dispersion were thickened with 15 g of a 25% aqueous polyacrylic acid solution (Mirox AM; Stockhausen) and pigmented with 100 g of an iron oxide brown paste (LEVANOX Braun 610 A; Bayer AG).

Coating

1. A 30% solution of an aliphatic one-component PUR according to D1 was pigmented with 10% of a commercial pigment paste (BAYDERM Farben B-TO/C-TO; Bayer). Using a knife-over-roll coater, a surface coat of 30 g of solids/m$^2$ was prepared on release paper and dried at 60° to 120° C. The 70% adhesive coat according to the invention was applied by a second coaster and a 200 g/m$^2$ cotton-polyester (weight ratio 1:1 blended fabric was applied by lamination, dried at 1000° to 140° C. and crosslinked at 150° to 160° C. Adhesive coating; 40 g solids/m$^2$, without any addition of crosslinking agents and/or catalysts, the 70% adhesive coating provided a solvent-resistant and cleaning-resistant costed article.

2. A 25% solution of an aromatic one-component PUR according to D2 was pigmented with 8% of a commercial pigment paste (BAYDERM Farben B-TO/C-TO: Bayer). The surface coat on release paper was dried at 90° to 140° C. Application: 27 g solids/m$^2$. As in 1. The 70% DMF-free adhesive coat solution according to the invention was applied by a second coater and a fabric was applied by lamination, dried and crosslinked. The surface coat, which could be laminated with standard surface coatings without DMF in the solvent mixture, could readily be laminated with the adhesive coating according to the invention without "frosting."

3. A 90% high-solids prepolymer according to D3 was mixed with 9.0% of 4,4'-diamino-3,3'-dimethyl dicyclohexyl methane as crosslinking agent and the resulting mixture was pigmented with 10% of a pigment paste containing PVC plasticizer (Renll FV-pigment pastes; Hoechst): 1% by weight of an ethoxylated dimethyl polysiloxane was added as levelling agent. A surface coat was produced on release paper as in 1. using this spreading paste; reaction temperature 150° to 160° C., solids application: 60 g/m$^2$. As in 1., a 70% mixed adhesive solution according to the invention was applied by a second coater and a fabric was applied by lamination, dried and crosslinked at 150° to 160° C.

4. A 40% dispersion paste according to D4 was applied by a knife-over-roll coater to a release paper of high wet strength and dried at 80° to 140° C. Solids application: 25 g/m$^2$. As in 1. a 70% adhesive coat solution according to the invention was applied by a second spreader and a fabric was applied by lamination dried and crosslinked at 150° to 160° C.

EXAMPLE 2

Surface coat (according to the invention)

After dehydration, 1340 g of the polyester described in Example 1 (OH value 56) and 660 g of the polyether of propylene oxide (OH value 56) also described in Example 1 were reacted at 90° C. with 500 g 4,4′-diisocyanatodiphenyl methane in 1450 g of Solvesso 100 solvent. The NCO groups of the NCO prepolymer were blocked with 206 g of butanone oxime at 80° to 90° C. After dilution with 1000 g of isobutanol, the solution of the NCO prepolymer had a solids concentration of 52.5%: the (blocked) NCO content was 1.6%. The blocked NCO groups of the prepolymer were mixed with 190 g of 4,4′-diaminodicyclohexyl methane, dissolved in 450 g of isobutanol and reacted at 90° to 120° C. The 50% solution of this polyurethane urea contained a residue of blocked NCO groups (approximately 60% of the groups were reacted), had a viscosity of 10,000 mPa.s at 25° C. and a base nitrogen content of 0.18%.

Adhesive coat (according to the invention)

4326 g of the 68.6% solution of the blocked NCO prepolymer described in Example 1 (blocked NCO content 1.9%) were reacted with 51 g of ethylenediamine (corresponding to 85 equivalent percent of the calculated quantity) at 90° to 100° C. The resulting solution of the 68.9% polyurethane urea containing residual blocked NCO groups and free amino groups (base nitrogen: 0.32%) had a viscosity of 18,000 mPa.s at 25° C.

Coating

The 50% surface coat solution was pigmented with 12% of a commercial pigment paste, coated onto release paper by knife-roll coater, gap width 0.1 mm, dried at 100° to 140° C. and crosslinked at 150° to 160° C. Solids applied: 35 g/m². The approximately 69% adhesive coat was applied by a second knife-roll coater and a 140 g/m² polyester fabric is laminated thereto, dried at 100° to 140° C. and crosslinked at 150° to 160° C. Total solids applied in surface coat and adhesive coat: 75 g/m².

EXAMPLE 3

Surface coat

After dehydration, 600 g of a polycarbonate of hexane-1,6-diol and diphenyl carbonate, OH value 56, and 1400 g of a polyether of ethylene oxide, OH value 56, were reacted with 1000 g of 4,4′-diisocyanatodiphenyl methane at 60° to 80° C. After the prepolymer had been dissolved in 3050 g of DMF and 4580 g toluene, 270 g butane-1,4-diol were added and the mixture was left to react for 6 h at 70° C. The 30% solution had a viscosity of 37,000 mPa.s/25° C. A 26μ thick film prepared from this solution had a permeability to water vapor, as measured in accordance with IUP15, of 4.5 mg/cm²/h.

Adhesive coat (according to the invention)

After drying, 520 g of the polyether of propylene oxide/ethylene oxide (OH value 28) described in Example 1 and 1740 g of a polyether of ethylene oxide, OH value 56, were reacted at 90° C. with 500 g of 4,4′-diisocyanatodiphenyl methane. The NCO groups of the prepolymer were blocked with 206 g of butanone oxime and dissolved in 825 g of methoxy propyl acetate at 80° to 90° C. After dilution with 825 g of methoxypropanol, the blocked NCO prepolymer was present in the form of a 64.3% solution and had a blocked NCO content of 1.82%. 90% of the blocked NCO groups were reacted with 103 g of 1,4-diaminocyclohexane in 30 minutes at 90° to 100° C. The 65% solution had a base nitrogen content of 0.2% and a viscosity of 18,000 mPa.s at 25° C. A 30μ thick film prepared from the solution, crosslinked for 1 minute at 150° to 160° C., had a permeability to water vapor of 4 mg/m²/h.

Coating

The 30% surface coat solution was pigmented with 10% of a commercial pigment paste (BAYDERM Farben F-TO/C-TO; Bayer AG). A surface coat was produced on a smooth mat paper by knife-roll coater (solids application 28 g/m²). The 65% adhesive coat solution was knife-coated onto this surface coat. Wet application approximately 100 g/m². A 150 g/m² cotton/spun rayon fabric was applied by lamination, dried at 110° to 140° C. and crosslinked at 150° to 160° C.

The coated article had a total solids application of approximately 90 g/m² and a permeability to water vapor of 3.5 mg/cm²/h (IUP 15).

EXAMPLE 4

Three-layer transfer coating of skiver

A surface coat of the aliphatic one-component PUR according to Example 1/D1 was applied as described in B1 to an embossed release paper (solids application 30 g/m²). An intermediate coat was applied to this surface coat by knife-coating using the 70% adhesive coat according to the invention described in Example 1, dried at 100° to 140° C. and crosslinked at 150° to 160° C. (solids application approx. 100 g/m²). A 35% PUR solution in DMF/MEK (for preparation, see below) was used as the adhesive coat.

The skiver was applied to the wet adhesive coat, laminated and dried. The total application of PUR solids was approximately 170 g/m².

Adhesive coat 706 g of a 1,2-propylene glycol polyether, OH value 56, were reacted with 240 g of diphenylmethane-4,4′-diisocyanate in 660 g toluene at 100° C. to form an NCO prepolymer from which the polyurethane was produced after the addition of 54 g of butane-1,4-diol in 700 g DMF and 500 g methyl ethyl ketone at 80° C. The 35% solution had a viscosity of approximately 25,000 mPa.s at 25° C.

EXAMPLE 5

Direct coating paste (according to the invention)

The quantities of polyhydroxyl compounds described in Example 1/adhesive coat were reacted with the quantity of 4,4′-diisocyanatodiphenyl methane mentioned therein at 90° C. in 1100 g of Solvesso 100 solvent. The NCO groups of the NCO prepolymer were then blocked with 210 g of butanone oxime at 80° to 90° C. After dilution with 1100 g of tert.-butanol, the blocked NCO prepolymer was present in the form of a 57.4% solution and had an NCO content of 1.62%. The blocked NCO groups were then reacted at 90° to 100° C. with a mixture of 129 g 3,3′-dimethyl-4,4′-diaminodicyclohexyl methane and 61 g isophoronediaine, corresponding to 90% of the calculated quantity. The 60% solution of the polyurethane urea containing residual blocked NCO groups and having a base nitrogen content of 0.2% had a viscosity of 18,000 mPa.s at 25° C.

A lightweight (60 g/m²) polyamide fabric was finished with 15 g/l of a fluoroalkyl acrylate copolymer (XERODERM WF: Bayer AG). The pretreated fabric was coated with the 60% coating paste by direct coating using an air knife coater and dried at 110° to 140° C. A second, thicker coat was applied by knife-roll coater, dried at 110° to 140° C. and crosslinked at 150° to 160° C. The solids application was 30 g/m².

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for coating a substrate with a polyurethane urea which comprises reacting a prepolymer based on an aromatic polyisocyanate containing an average of two ketoxime blocked NCO groups and having an average molecular weight of about 500 to 15,000 with (B) a chain-extending agent corresponding to the formula $$H_2N-R'-NH_2$$

in which R' is an aliphatic or cycloaliphatic radical, in the presence of a solvent at a temperature of greater than 50° C. and at an equivalent ratio of blocked isocyanate groups to NH₂ groups of 1.43 to 1.02 until about 40 to 90% of the amino groups have reacted, applying the partially reacted prepolymer to a substrate and crosslinking the coating at a temperature of greater than 120° C.

2. The process of claim 1 wherein the equivalent ratio of blocked NCO groups to amino groups is 1.18:1 to 1.05:1.

3. The process of claim 1 which comprises reacting about 50 to 70% of the amino groups prior to applying the coating to a substrate.

4. The process of claim 1 wherein said chain-extending agent corresponds to the formula

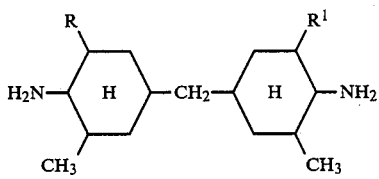

wherein R and R¹ represent H or $C_1$–$C_4$ alkyl.

5. The process of claim 1 wherein the initial reaction of component (A) and (B) is carried out at a temperature of about 70° to about 100° C.

6. The process of claim 1 which comprises conducting said crosslinking reaction at a temperature of about 150° to 160° C.

7. The process of claim 1 wherein said prepolymer is also based on a polyhydroxypolyether, a polyhydroxypolyester or a mixture thereof.

8. The process of claim 7 wherein said prepolymer is based on a mixture comprising about 40 to 90% by weight of a polyhydroxypolyether and the remainder comprising a polyhydroxypolyester.

9. A coated substrate produced in accordance with the process of claim 1.

* * * * *